Oct. 21, 1930.         S. J. BENS         1,779,083
LINK FOR BELTS OR CHAIN SAWS
Filed Jan. 26, 1927      2 Sheets-Sheet 1
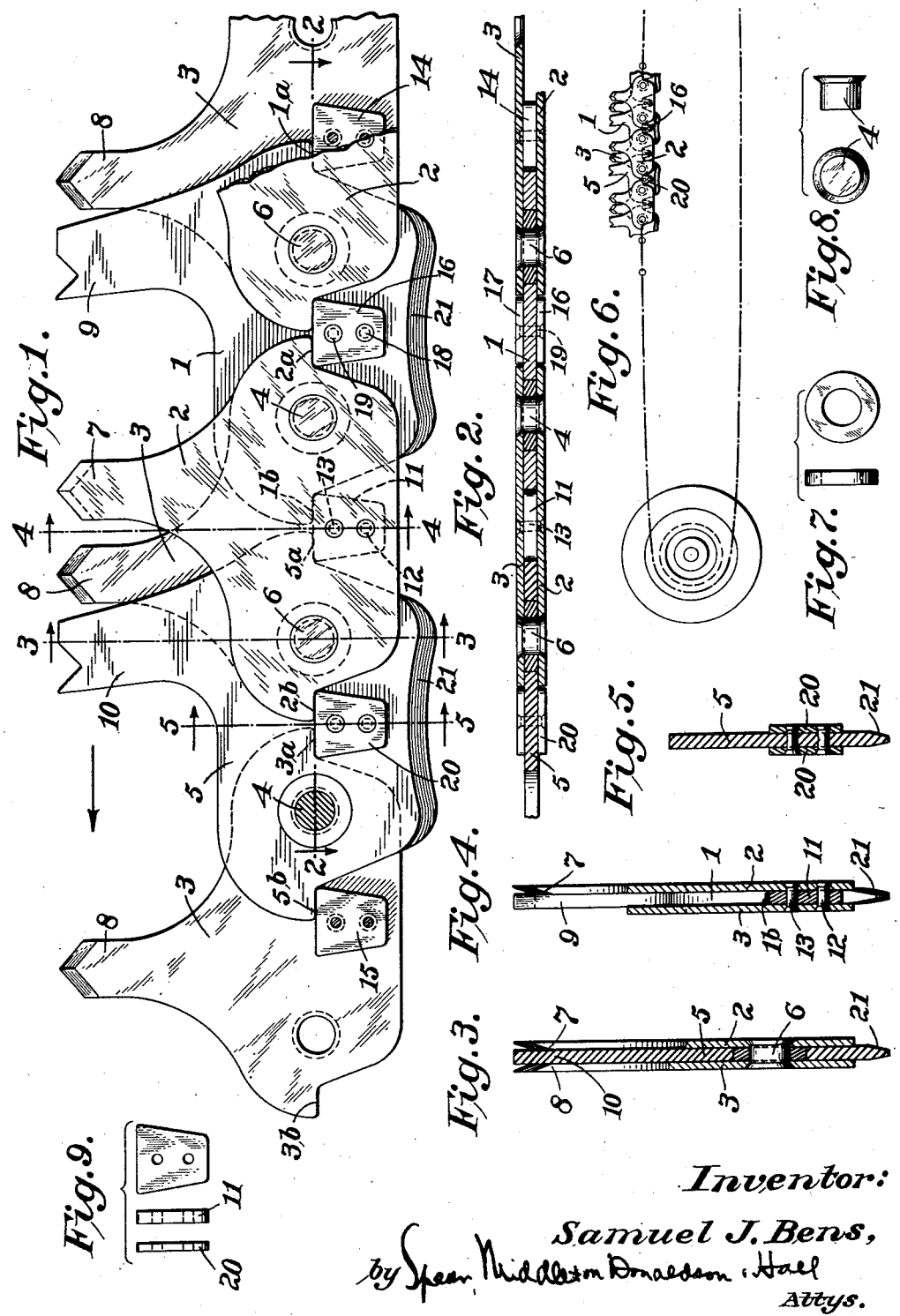
Inventor:
Samuel J. Bens,
by Spear, Middleton, Donaldson & Hall
Attys.

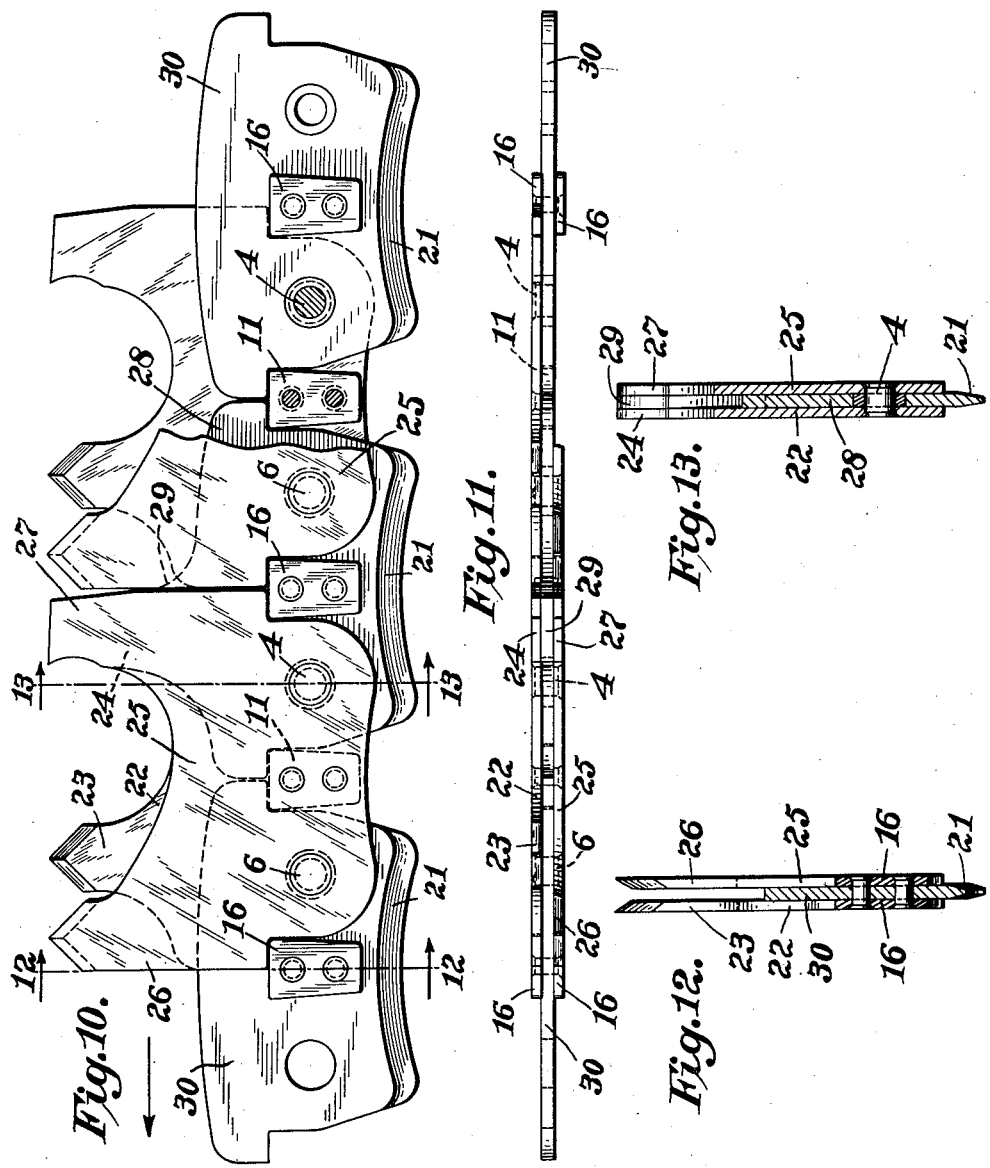

Patented Oct. 21, 1930

1,779,083

UNITED STATES PATENT OFFICE

SAMUEL J. BENS, OF NEW YORK, N. Y., ASSIGNOR TO CHAIN SAW CORPORATION, A CORPORATION OF DELAWARE

LINK FOR BELTS OR CHAIN SAWS

Application filed January 26, 1927. Serial No. 163,718.

My present invention relates to a link belt or chain and has particular reference to the cooperation between individual links so that an arc is maintained between pulleys to prevent sagging.

The invention finds an advantageous use in connection with chain saws, wherein the cutting blade is composed of a series of links, each carrying a tooth or teeth, the entire blade being of an endless form and travelling between pulleys, one of which is driven by some suitable power.

In saws of the above type it is desirable to maintain the cutting run thereof in an arc. When felling a tree it is desirable that the center of the cutting run of the saw cut ahead and beyond the ends of the cutting run for the reason that before the tree is cut through it will fall, and unless the uncut portion is of minimum extent, the lower section of the tree will split up the trunk and consequently be of less value than it would otherwise be. One of the principal objects of the invention is therefore to reduce this uncut portion to a minimum by maintaining the cutting run of the saw in the shape of an arc.

I have found by experiment that a saw of this type will do more efficient work if the blade can be kept more or less rigid between pulleys, both as against sagging horizontally and against straightening out the desirable arc above mentioned or becoming concave at this point. Another object is therefore to so arrange the individual links comprising the saw that they will cooperate together to prevent this undesirable action, yet which will allow the chain to pass easily around the pulleys at each end of the cutting run.

This straightening out of the arc, and horizontal sagging is ordinarily caused by wear at the pivots between links. Even though these rivets are made of the hardest steel or are provided with wear bushings, this sag will occur wherever the rivets or pivots are depended upon to maintain rigidity, as soon as a little wear occurs. In the present form of link herein described, the rigidity is maintained independently of the pivot pins and therefore no strain occurs at this point and they can consequently be made of less expensive material.

To this end my invention consists in the provision of a plurality of overlapping links having their overlapping ends pivoted together, opposite ends of each link having a shoulder thereon engaging a stop on its neighboring link so that a positive lock or bridge action is secured, and an arc once having been maintained, it cannot be straightened out, as there are no moving parts to wear.

The invention further consists in the combination, arrangement and construction of parts hereinafter described and shown in the accompanying drawings, in which:

Figure 1 is a fragmentary plan view of a chain constructed according to my invention.

Fig. 2 is a section on line 2—2 of the device of Fig. 1.

Fig. 3 is a sectional view along the line 3—3 of Fig. 1.

Fig. 4 is a sectional view along the line 4—4 of Fig. 1.

Fig. 5 is a sectional view along the line 5—5 of Fig. 1.

Fig. 6 is a diagrammatic view of the chain and a sheave illustrating the arc-shaped formation of the cutting run.

Fig. 7 is a detail of the wear ring surrounding the pivot.

Fig. 8 is a detail of the pivot.

Fig. 9 is a detail of a stop.

Fig. 10 is a plan view of a modified form of device.

Fig. 11 is an edge elevation of the device of Fig. 10.

Fig. 12 is a sectional view along the line 12—12 of Fig. 10.

Fig. 13 is a sectional view along the line 13—13 of Fig. 10.

In these drawings, I have shown a fragment of chain used as a saw and consisting of a link 1 having one of its ends held between the overlapping ends of links 2 and 3 as by pivot pin 4. A link 5 similar to link 1 is likewise held by a similar rivet 6 between the opposite ends of links 2 and 3.

In the construction shown, the links 2 and 3 are provided with offset extensions 7 and 8 respectively, comprising cutting teeth and links 1 and 5 with extensions 9 and 10 respectively constituting drag or clearer teeth for removing the saw dust from the kerf cut by the teeth 7 and 8.

It is to be understood that the chain saw as described consists of a series of links such as 1, 2, 3 and 5.

Each of the links is provided at opposite ends with a shoulder, such as shown at 1ᵃ and 1ᵇ, on link 1, 2ᵃ and 2ᵇ of link 2, 3ᵃ and 3ᵇ of link 3 and 5ᵃ and 5ᵇ of link 5.

Links 2 and 3 hold between themselves a stop 11, rivets or other fastening members 12 and 13 passing through link 2, stop 11 and link 3 and holding these three members together. Shoulders 1ᵇ and 5ᵃ of links 1 and 5 respectively are adapted to engage this stop 11. Each set of links similar to 2 and 3 are provided with a similar stop which functions in the same manner. It will be seen that shoulders 1ᵃ and 5ᵇ are supported upon and engage stops 14 and 15 respectively of the adjacent set of links.

Link 1 is provided with a set of stops 16 and 17 secured to each side thereof as by rivets 18 and 19. In like manner link 5 is provided with a similar pair of stops, one of which is indicated at 20. It will be seen therefore that link 2 has its shoulders supported upon and engaging stops 16 and 20 while the shoulders of link 3 engage the stops on the opposite sides of links 1 and 5.

In the modified form of device, the same general schematic plan is followed, except that the arrangement of teeth upon the links is varied.

For instance, and as shown in Figs. 10 to 13 inclusive, a link 22 is provided having a cutting tooth 23 near one end thereof, and a clearer tooth 24 at the other end. A corresponding link 25 is also provided having a cutting tooth 26, offset as to the cutting tooth 23, and a clearer tooth 27 coinciding with clearer tooth 24.

Between the ends of cutter links 22 and 25, spacer links are held. These links may take the form shown as at 28, which link is provided with a clearer tooth 29 coinciding with clearer teeth 24 and 27. Obviously a similar spacer link may be included between the opposite ends of links 22 and 25 if desired.

In some cases it has been found dsirable to have a spacer link such as at 30, without a clearer tooth. In such a case it will be noted that a space will exist between clearer teeth 24 and 27, while if the spacer link of the form shown at 28 is used, this space will not exist, and the composite clearer will be of substantially the same thickness as the kerf cut by cutting teeth 23 and 26. In the latter case, removal of all saw dust or particles from the kerf is assured.

In both of the above cases, it will be noted that the same pivot pins 4 and 6 are used to secure the overlapping links together, and stops 11 and 16 used with the cutting and spacer links respectively. The cooperation of the link shoulders and these stops is identical with that described in connection with the form shown in Fig. 1.

It will be noted in Fig. 10, that the edges of the cutting links are so formed that they abut when the corresponding shoulders seat on the stops. This further serves to maintain the arc above described and contributes toward an efficient chain.

The various stops are so located on the respective links that the cutting run of the saw assumes the form of an arc, which is desirable as above described. While in this position, the entire thrust of the tree against the arc is taken by the shoulders of the links against the stops and not by the link pivots. As there is no rubbing or moving of these shoulders against the stops, no wear occurs at these points, so that the saw always maintains its convex formation regardless of wear at other points.

It is to be noted that in both forms, the stops are so shaped as to snugly fit the corner formed by the juncture of the shoulder and body of the respective links so that longitudinal spread of the cutting run of the saw is prevented. As such, the link pivots do not receive the strain of any tendency to spread.

As shown, the spacer links, in both forms of chain, are provided with bevelled portions 21 on their inner edges, adapted to frictionally engage a similarly shaped groove in a sheave for driving purposes, but which is not shown and to which no claim is made in this application.

While I have shown this type of link as used in a chain saw, it is to be understood that it is also adapted for use in a belt of the link or chain type, regardless as to whether the links contain saw teeth or not.

Obviously the individual links may move to a limited extent in one direction about their common pivots, as when travelling around a sheave, but movement in the other direction is limited by the stops engaging the link shoulders.

The fact that the links 2 and 3 over and underlie the links 1 and 5, prevents sag of the saw when occupying a horizontal position.

I claim:

1. A chain saw comprising an endless series of toothed links, including pairs of superimposed links fixed to each other in spaced apart relation by stop members secured therebetween, and connecting links having their ends between said pairs of links and pivotally secured thereto, said connecting links each having stop members secured to the opposite sides thereof, the ends of said connecting links being adapted to engage the stop member between the pairs of links and the ends of said pairs of links being adapted to engage the stop members on said connecting link.

2. A chain saw comprising an endless series of toothed links having cooperating means thereon, maintaining a self-sustained arc shaped cutting run, said cooperating means limiting inward sagging movement of said chain saw.

3. A chain saw comprising an endless series of toothed links having cooperating means thereon, maintaining a self-sustained arc shaped cutting run, said cooperating means limiting inward sagging movement of said chain saw and preventing spreading of the links.

4. A chain saw comprising an endless series of toothed links according to claim 3 in which said cooperating means comprise an inwardly facing shoulder on each end of each link and providing laterally facing abutment surfaces on said link adjoining said shoulders, and stop members on each link adapted to be snugly engaged by said shoulders and a portion of said lateral abutment surfaces.

5. A chain saw comprising an endless series of toothed links including a pair of superimposed links having a stop secured therebetween, other links having their ends between the pair of links and pivoted thereto, a stop on each side of said other links, and a shoulder at each end of each link adapted to engage the stop on its adjacent link to maintain an arc shaped cutting run by preventing pivotal movement between the links in one direction.

6. Apparatus according to claim 1 in which the component links of said pairs of superimposed links are each provided with a cutting tooth and a clearing tooth, said cutting teeth being misaligned, and said clearing teeth being in aligned superimposition, and said connecting links being provided with a clearing tooth between and aligned with said aligned clearing teeth.

7. A chain saw comprising an endless series of toothed links, including pairs of superimposed links fixed to each other in spaced apart relation by stop members secured therebetween, and connecting links having their ends between said pairs of links and pivotally secured thereto, said connecting links each having stop members secured to the opposite sides thereof, the ends of said connecting links being adapted to engage the stop member between the pairs of links and the ends of said pairs of links being adapted to engage the stop members on said connecting links, said stop members maintaining the chain saw with its series of links describing an arc, the ends of said links each being provided with an inwardly facing shoulder and laterally facing abutment surfaces adjoining the shoulders for snugly engaging the said stop members, whereby the chain saw is maintained in said arc and separation of the links is prevented.

In testimony whereof I affix my signature.

SAMUEL J. BENS.